United States Patent [19]
Salisbury

[11] 4,007,425
[45] Feb. 8, 1977

[54] TEMPERATURE SENSOR USING PULSE WIDTH MODULATOR FOR DUTY CYCLE CONTROL

[75] Inventor: Leroy J. Salisbury, Westford, Mass.

[73] Assignee: The United States of America as represented by the Secretary of the Army, Washington, D.C.

[22] Filed: Jan. 12, 1976

[21] Appl. No.: 648,614

[52] U.S. Cl. .................................. 328/3; 328/5; 307/310
[51] Int. Cl.² .................................. G01K 7/00
[58] Field of Search ............... 328/1, 3, 5; 307/310; 330/30 D; 331/65, 66; 219/499–501

[56] References Cited
UNITED STATES PATENTS

| | | | |
|---|---|---|---|
| 3,443,124 | 5/1969 | Pinckaers | 328/3 |
| 3,749,884 | 7/1973 | Detmann et al. | 219/501 |
| 3,777,187 | 12/1973 | Kohn | 219/501 |
| 3,814,957 | 6/1974 | Way | 328/3 |

*Primary Examiner*—Stanley D. Miller, Jr.
*Assistant Examiner*—B. P. Davis
*Attorney, Agent, or Firm*—Nathan Edelberg; Robert P. Gibson; Robert C. Sims

[57] ABSTRACT

The temperature controller senses the temperature unbalance and converts this into a DC voltage which is compared with an oscillator by a pulse width modulator. The output of pulse width modulator controls the duty cycle of a heater.

1 Claim, 4 Drawing Figures

TEMPERATURE SENSOR USING PULSE WIDTH MODULATOR FOR DUTY CYCLE CONTROL

DESCRIPTION OF THE PREFERRED EMBODIMENT

The temperature controller (TC) operation for a head gyro heater is such that it regulates the duty cycle of a pulse width modulated (PWM) so as to adjust the heater power level to the magnitude necessary to achieve and maintain the desired sensor resistance magnitude.

Figure 1:
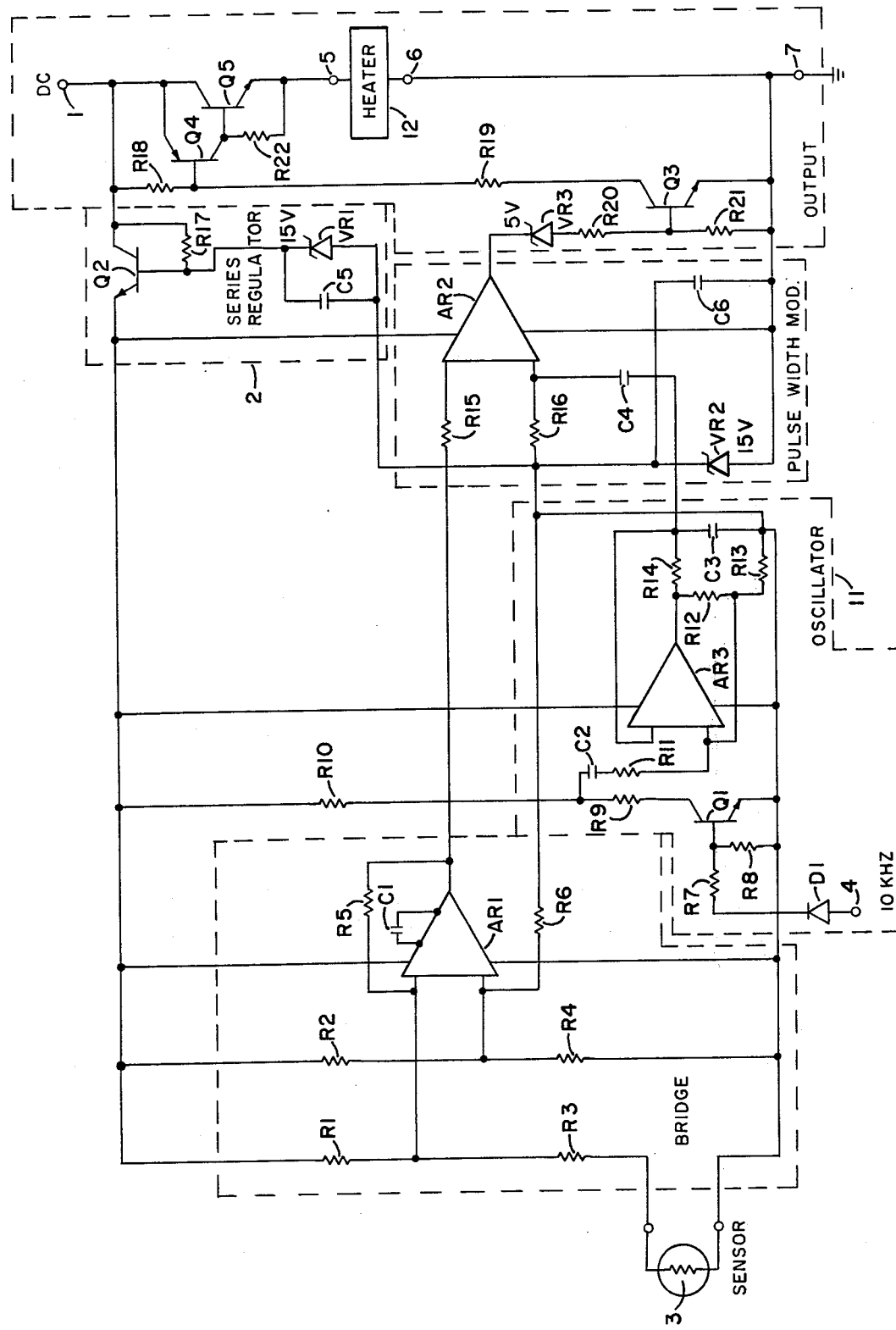
FIG. 1 is a schematic showing of a preferred embodiment of the present invention.

A schematic of the thermal controller is shown in FIG. 1. The TC operates from a single DC voltage supply terminal 1. A series regulator 2 is used to provide the regulated low level bias voltages that are necessary to operate the integrated circuit networks.

A bridge network (R1, R2, R3, R4, and temperature sensor 3) is used to transform sensor resistance to an equivalent voltage. Common mode voltage errors are reduced to acceptable levels through use of a symmetrical bridge (a direct function of component tolerance). The bridge will be balanced only at the single resistance value associated with the desired operating temperature of the sensor. The bridge unbalance is amplified by amplifier AR1 and compared with the voltage existing at R16.

The network R12-R14 and C3 associated with amplifier AR3 is a free running oscillator 11 at 8 kHz. The network R7-R11, D1, and C2 associated with Q1 enables outside control of the oscillator and forces it to operate at 10 kHz. Thus, the basic carrier frequency of the TC can be synchronized to other system frequencies (not shown) connected to terminal 4 when they are present, thereby eliminating uncontrolled frequency lines within a missile system. The free running operation is required during standby operation, since other subsystems are off, and the 10 kHz sync signal is not available at terminal 4.

Figure 2A:
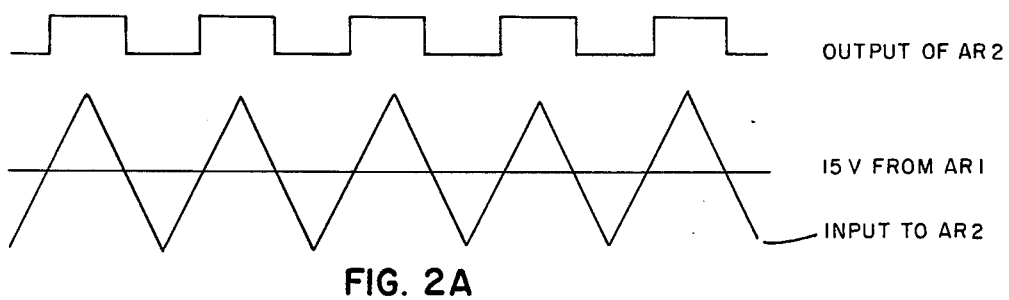
FIGS. 2A–2C are waveforms of the outputs of specific components in FIG. 1.

The output of the oscillator 11 (node R14, C3, etc.) is a linear triangular wave shown in FIG. 2A. This signal is AC-coupled by C4 to a high gain differential amplifier (AR2) and compared with the output voltage from AR1. VR2 and R6 are used to provide a common bias for the differential error signal at the input of AR2 at 15 volts above ground level. Thus, at bridge null, the output of AR2 is a 50% duty cycle square wave at the carrier frequency also shown in FIG. 2A. As the sensor resistance (temperature) varies from its operating level, the output of AR1 increases (FIG. 2B) or decreases (FIG. 2C) from its bias level 15 volts and causes the output duty cycle of AR2 to vary (Pulse Width Modulation) from its nominal 50% level.

The output of AR2 controls Q5 by way of VR3, R18-R22, Q3 and Q4 so as to provide power gain and regulate the heater 12 RMS voltage level (power) out to output terminals 5 and 6.

The temperature controller of FIG. 1 operates from a single, external 50 to 56 volt power supply. A series regulator comprising transistor Q2, and zener diodes VR1 and VR2 provide the regulated low level bias voltages that are necessary to operate the integrated circuit networks. Two bias voltages of 30 volts and 15 volts are supplied to the integrated circuit networks. The 15 volt bias is used to bias the bridge amplifier (AR1) and the pulse width modulator (AR2) 15 volts above ground in order to provide a minimum voltage output of 15 volts at a zero gain condition for reasons to be explained hereinafter.

Transistor Q2, in series regulator 2, serves to reduce bias voltage fluctuations due to load current variations by means of regulating the current flow through zener diodes VR1 and VR2. Thus, load current variations through R17 are reduced by the Beta of the transistor to yield a total current variation $\Delta I = IL/\beta$. This, in effect, restricts the zener diodes to operate only about a limited portion of their knees thereby reducing possible voltage variations.

The TC circuit employs only a single point ground 7, as shown on the output stage of the power amplifier in the output switch, in order to reduce "cross-talk" between the various sections of the temperature compensator.

The sensor 3 is a temperature-sensitive resistor located within the unit to be controlled which may be either a gyro or an auxiliary oven. As such, the sensor can be considered to be an integral part of the temperature compensator and is therefore continuously operating.

The oscillator section 11 is free running at 8 kHz in order to provide a self-contained trigger signal for driving the pulse width modulator in the standby mode of operation. In the standby mode of operation, there are no other circuits within the missile which are operating and which could provide the required trigger signals. The 8 kHz rate was chosen simply as it is below the rate of the system clock which is here 10 kHz and which is not available until such time as the missile is in the operating mode. Once the 10 kHz signals are available at terminal 4, the oscillator is synchronized to them through transistor Q1. The 10 kHz trigger input to Q1 is obtained from a system clock (not shown) which is activated when the missile is switched into the operating mode. The 8 kHz oscillator is synchronized to the 10 kHz clock by means of transistor Q1. Transistor Q1 is triggered by means of the 10 kHz clock applied to its base. Oscillator AR3 is triggered at a 10 kHz rate by means of transistor Q1 switching its bias voltage through capacitor C2 and resistor R11.

The temperature controller operation is such that it regulates the duty cycle of a pulse width modulated heater 12 so as to adjust the heater power level to the magnitude necessary to achieve and maintain the desired sensor resistance magnitude. Thus, if the temperature of sensor 3 changes, its resistance will correspondingly change. The change in resistance is transformed to an equivalent change in voltage by the bridge circuit. The bridge unbalance is amplified by AR1, sent through resistor 15 to AR2 and compared with the voltage existing at R16. The DC voltage level at R16 is 15 volts. The triangular wave output out of the oscillator AR3 serves to modulate the 15 volt signal at R16 where it is compared with the output voltage from AR1.

At bridge null, associated with the desired operating temperature of the sensor, the output of the pulse width modulator AR2 is a 50% duty cycle square wave at the carrier frequency as is shown in FIG. 2A. As the sensor resistance (temperature) varies from its operating level, the output of AR1 increases or decreases from its bias level and causes the output duty cycle to AR2 to vary from its nominal 50% level as is shown in FIGS. 2B and 2C respectively.

Figure 2B:
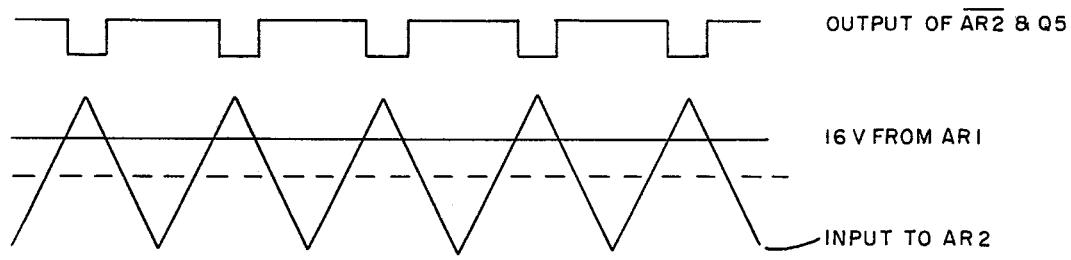
Figure 2C:
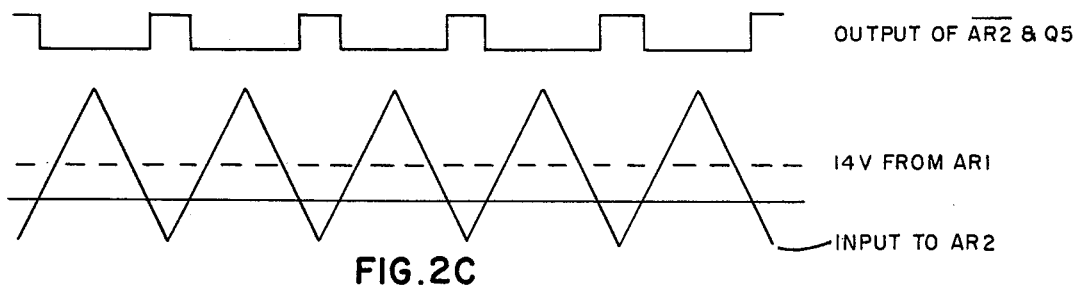

Shown in FIG. 2B is the duty cycle out of the pulse width modulator when the temperature sensor is high, causing the voltage out of AR1 to increase and thereby keeping the heater ON for a shorter period of time. FIG. 2C illustrates the corresponding duty cycle when the temperature sensor is low, thereby requiring the heater to remain ON for a longer time period.

The difference between the standby and operating modes is that the PRF of the pulse width modulator will change from 8 kHz to 10 kHz, respectively.

I claim:
1. A system comprising sensing means having an input and an output for detecting an input signal and presenting it to its output; a freerunning oscillator having a triangular waveform output; pulse width modulating device having inputs connected to the outputs of said sensing means and said oscillator so that the duty cycle output of said pulse width modulator device is varied in accordance with the signal input to said sensing means; said pulse width modulator device is connected to a ground connection; said sensing means and oscillator being maintained at a predetermined voltage above ground; a bridge circuit having outputs connected to said sensing means; one leg of said bridge circuit being fed said signal input; said bridge circuit being a symmetrical bridge circuit; said sensing means being an amplifier having two input terminals connected across said bridge circuit; an amplifier device connected to the input of said oscillator so as to cause said oscillator to operate at the output of the amplifier's oscillations when said amplifier has an input fed to it; said pulse width modulating device being a differential amplifier having first and second inputs; and said first input being connected to the output of said sensing means and said second input being connected to the output of said oscillator.

* * * * *